Sept. 16, 1924.
L. F. HOWARD
1,508,554
RAILWAY TRAFFIC CONTROLLING APPARATUS
Filed Jan. 9, 1923
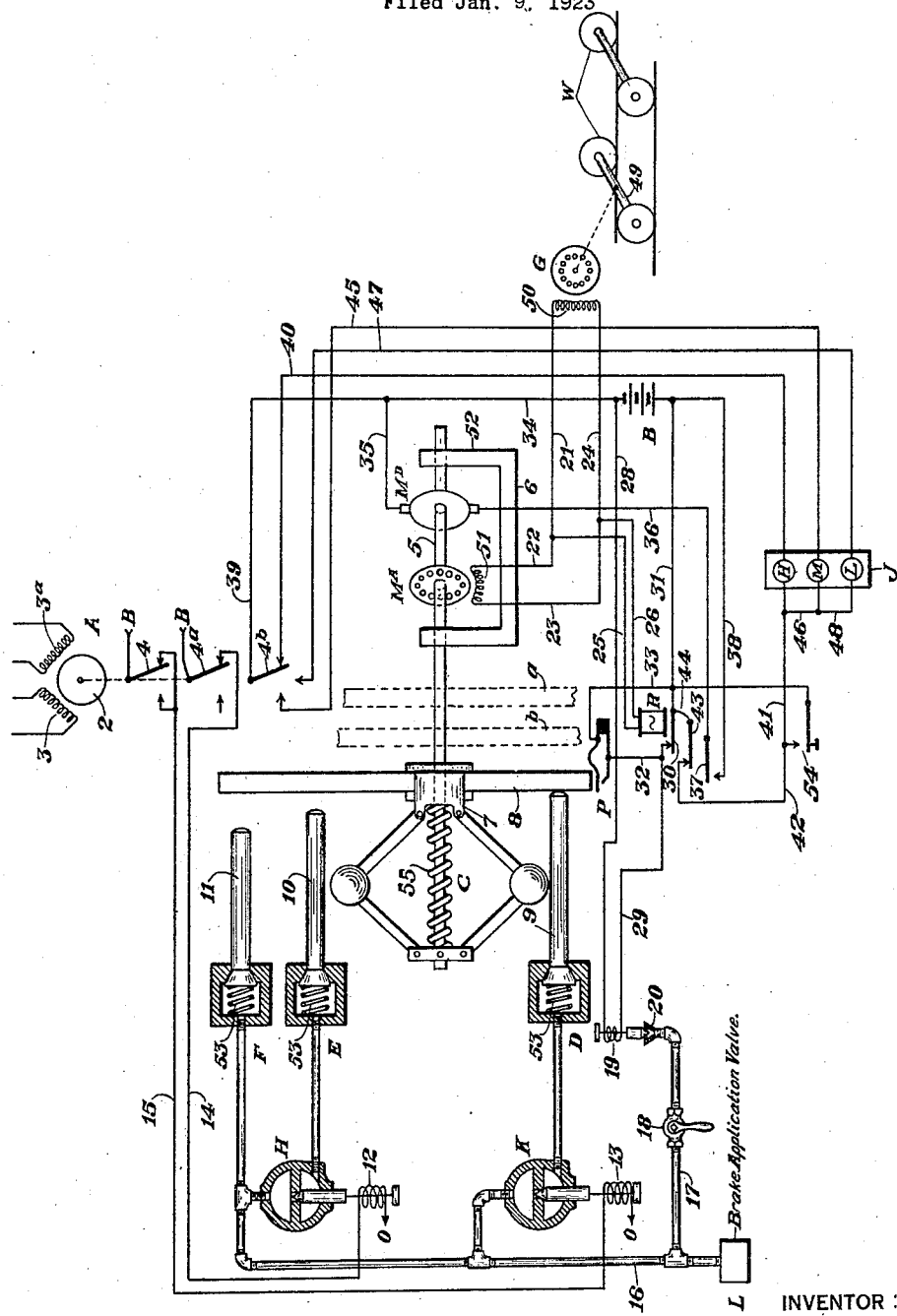
INVENTOR:
L. F. Howard,
BY
A. L. Vencill
His ATTORNEY Patented Sept. 16, 1924.

1,508,554

UNITED STATES PATENT OFFICE.

LEMUEL F. HOWARD, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAFFIC-CONTROLLING APPARATUS.

Application filed January 9, 1923. Serial No. 611,596.

*To all whom it may concern:*

Be it known that I, LEMUEL F. HOWARD, a citizen of the United States, residing at Edgewood Borough, in the county of Allegheny and State of Pennsylvania, have invented certain new and useful Improvements in Railway-Traffic-Controlling Apparatus, of which the following is a specification.

My invention relates to railway traffic controlling apparatus, and particularly to vehicle-carried apparatus controlled by energy received from the trackway for governing the speed of the vehicle.

I will describe one form of apparatus embodying my invention, and will then point out the novel features thereof in claims.

The accompanying drawing is a view, partly diagrammatic, showing one form of apparatus embodying my invention.

Referring to the drawing, the reference character W designates a pair of wheels and axles of a railway vehicle, upon which vehicle all of the remaining parts illustrated in the drawing are mounted. The vehicle is provided with a relay A comprising a rotor 2, two stator windings 3 and $3^a$, and a plurality of contacts 4, $4^a$ and $4^b$. The stator windings 3 are supplied with energy from the trackway in such manner that under proceed traffic conditions contacts 4 are swung to the right, under caution traffic conditions these contacts are swung to the left, and under stop traffic conditions, these contacts occupy intermediate or vertical positions. The means for controlling the supply of current to the stator windings 3 and $3^a$ form no part of my present invention, and, consequently, is not illustrated herein.

Operatively connected with an axle 49 of the vehicle is an alternating current generator G. Inasmuch as the speed of this generator is proportional to the angular velocity of the axle 49, it follows that the frequency of the current delivered by the stator winding 50 of the generator is proportional to the actual speed of the vehicle. The generator G supplies current to a motor $M^A$, the circuit being from stator 50, through wires 21 and 22, stator winding 51 of the motor $M^A$, and wires 23 and 24 to winding 50. Motor $M^A$ operates as a synchronous motor; that is, its speed is proportional to the frequency of the current with which it is supplied, and so the speed of this motor is proportional to the actual speed of the vehicle W. The motor $M^A$ drives a shaft 5 which is journalled in a frame 52, and this shaft in turn drives a centrifuge C which controls a crosshead 8 through the medium of a sliding collar 7. The crosshead 8 is biased toward the right by a spring 55. It follows that the longitudinal position of the crosshead 8 on the shaft 5 is proportional to the speed of rotation of motor $M^A$, and, consequently, proportional to the actual speed of the vehicle. That is to say, when the vehicle is at rest, the crosshead 8 occupies the dotted line position *a* (in so far as the control of this crosshead by the motor $M^A$ is concerned), and as the speed of the vehicle increases the crosshead 8 moves toward the left.

The crosshead 8 and the relay A are utilized jointly to control the speed of the vehicle W through the mechanism which I will now describe.

The reference characters D, E and F designate valves provided respectively with valve stems 9, 10 and 11, arranged for cooperation with the crosshead 8. Each valve is normally closed by a spring 53. The cooperation is such that when the speed of the vehicle is a low value such as 15 miles per hour the crosshead 8 actuates stem 9 to open valve D against air pressure and a spring 53, both of which tend to hold the valve in the closed position. As the speed of the vehicle rises to an intermediate value, such as 35 miles per hour, the crosshead 8 actuates the stem 10 to open valve E, and when the speed exceeds the maximum permissive value, the crosshead actuates the stem 11 to open valve F. The valve F is connected through a pipe 16 with a brake application valve L which is so constructed that when the pipe 16 is opened to atmosphere, as for example by opening valve F, an automatic application of the brakes occurs. Valve E is also connected with the pipe 16 through the medium of the valve H controlled by a magnet 12, and valve D is connected with the pipe 16 through the medium of a value K controlled by a magnet 13. Valves H and K are controlled by relay A, the circuit for magnet 12 of valve H being from terminal B of a suitable source of current through the right-hand point of contact 4ª, wire 14, and the winding of magnet 12 to terminal O of the same source of current. The circuit for magnet 13 of valve K is from terminal B through either the right or the left-hand point of contact 4 of relay A, wire 15 and the winding of magnet 13 to terminal O of the same source of current. It will be seen, therefore, that valve H is closed only when relay A is energized in the proceed direction, whereas valve K is closed when relay A is energized in either the proceed or the caution direction.

The operation of the speed governing apparatus, is as follows:

Assuming that relay A is energized in the proceed direction, valves H and K are both closed so that the opening of valves D and E by the crosshead 8 will have no effect on the brake application valve L. The vehicle may proceed, therefore, at any speed up to its maximum permissive speed, such as 65 miles per hour without incurring an automatic application of the brakes. If this maximum permissive speed is exceeded, however, valve F will be opened and a brake application will occur. Assuming that the relay A reverses, that is, that the contact fingers 4 swing to the left, it will be seen that valve H will open but valve K will remain closed. If the speed is below the intermediate value and above the low value, valve D will be opened, but this will have no effect on the brake application valve L, because valve K is closed; if the speed of the vehicle exceeds the intermediate or 35 miles per hour value, however, valve E will open and the exhaust of air through this valve will cause an automatic application of the brakes. I will now assume that relay A becomes de-energized, thereby permitting both valves H and K to open. If the speed of the vehicle then exceeds the safe low value of 15 miles per hour, valve D will open and the consequent exhaust of air through this valve will cause an automatic brake application due to the operation of valve L.

The apparatus which I have thus far described will function properly to control the speed of the vehicle as long as the centrifuge C responds to variations in the angular velocity of the axle 49. If this response of centrifuge C should fail, however, for any reason, such for example as failure of generator G, motor M$^A$, or the electrical connections between the two, or if the rotor of motor M$^A$ should stick in its bearings, it is clear that the speed of the vehicle would not be reflected in the position of the crosshead 8, and so the apparatus would then fail to properly control the speed of the vehicle in accordance with traffic conditions in advance.

To guard against a failure of this kind, I have provided auxiliary apparatus which I will now describe.

The generator G supplies current to a relay R through a circuit which passes from generator G, through wires 21 and 25, winding of relay R and wires 26 and 24 to generator G. This relay in other words is connected in multiple with motor M$^A$. I do not desire to be limited to this particular arrangement, however, because in some instances it may be desirable to connect relay R in series with motor M$^A$ and generator G. The relay R is so designed that its contacts are closed when the speed of the vehicle is above the fixed low value which I have hereinbefore assumed to be 15 miles per hour, and open when the speed of the vehicle is below this value. This may be accomplished by causing relay R to be responsive to variations in frequency or to variations in voltage delivered by the generator G. The relay R controls the supply of current to a magnet 19, the circuit being from battery B, through wire 28, winding of magnet 19, wire 29, contact 30 of relay R, and wire 31 to battery B. Magnet 19 controls a valve 20 in such manner that this valve is closed when the magnet is energized, but is free to open when the magnet becomes de-energized. The valve 20 is connected with a pipe 17, which in turn leads to the pipe 16 controlling the brake application valve L. As here shown, a cock 18 is interposed in the pipe 17, which cock is sealed in the open position. It will be seen, therefore, that in so far as the control of valve 20 by relay R is concerned, the brakes will be applied whenever the speed is below 15 miles per hour.

Mounted on the shaft 5 which drives the centrifuge C is a direct current motor M$^D$, which is supplied with current from battery B when relay R is open. The circuit for this motor is from battery B, through wires 34 and 35, motor M$^D$, wire 36, back contact 37 of relay R, and wire 38 to battery B. When motor M$^D$ is energized, it drives shaft 5 at a speed corresponding to a vehicle speed of between 10 and 14 miles per hour, so that the crosshead 8 then occupies a position between the position in which it is shown in solid lines and the position indicated by the dash lines b. When in this position the crosshead 8 closes a contact P and this contact when closed forms a shunt around contact 30 of relay R, this shunt comprising wires 32 and 33 as well as the contact P. When the speed of the vehicle is below 15 miles per hour, therefore, contact P is closed, so that in spite of the fact that relay R is open magnet 19 remains energized and valve 20 remains closed to prevent an automatic application of the brakes.

The reference character J designates a cab signal comprising three electric lamps H, M and L, indicating, when lighted, three permissive speeds, which I will term "high," "medium" and "low." These lamps are controlled jointly by relays A and R, and the circuit for the high speed lamp H is from battery B, through wires 34 and 39, right-hand point of contact 4ᵇ, wire 40, lamp H, wires 41 and 42, contact 43 of relay R, wires 44 and 31 to battery B. The circuit for lamp M similarly includes the left-hand point of contact 4ᵇ, wire 45 and wire 46, whereas the circuit for the stop lamp L includes the middle point of contact 4ᵇ, wire 47 and wire 48. It will be seen from the foregoing that the high speed lamp H is lighted when the relay A is in the proceed position, the medium speed lamp M is lighted when the relay A is in the caution position, and the low speed lamp L is lighted when relay A is de-energized. All three lamps are normally extinguished however, when relay R is de-energized, because the circuits for all three lamps include contact 43 of this relay. These circuits are provided with a shunt around contact 43, which shunt includes a normally open push button 54 within reach of the engineer. When relay R is de-energized the engineer need only close the push button 54 to determine the speed limit permitted by the traffic conditions as they then exist.

The operation of the protective apparatus which I have hereinbefore described, is as follows:

When the vehicle is at rest, relay R will, of course, be de-energized, so that motor Mᴰ is supplied with current and the shaft 5 is rotated at such speed as to cause the crosshead 8 to close contact P. Magnet 19 is therefore energized so that an automatic brake application will be prevented in so far as such application is dependent on the opening of valve 20. The engineer will have no information from the cab signal J of traffic conditions ahead due to the fact that the circuits for all three lamps in this signal are open at contact 37 of relay R. By closing the button 54, however, he may close the circuits for the signal lamps at this point and so may ascertain if it is permissible for him to proceed and at what speed. As the vehicle is set into motion and the speed increases, current is supplied to the synchronous motor Mᴬ, and when this current reaches such value that the motor Mᴬ is able to rotate the centrifuge C at the speed at which it is being rotated by the direct current motor Mᴰ, relay R closes. The closing of relay R supplies current to the cab signal J, which then remains lighted as long as the vehicle runs at that speed or higher, and the opening of contact 37 of relay R de-energizes the direct current motor Mᴰ so that this motor no longer consumes energy from battery B. As the speed of the centrifuge increases with the acceleration of the vehicle, the crosshead 8 moves away from contact P, but valve magnet 19 is not de-energized because current is now supplied to this magnet through front contact 30 of relay R. The position of the crosshead 8 now controls the application of the brakes according to speed and traffic conditions as hereinbefore explained. If for any reason, such as failure of the axle driven generator G, breakage of a wire leading to the synchronous motor Mᴬ, seizing of the bearings of the motor shaft, or other abnormal cause, the speed of rotation of the centrifuge shaft 5 is reduced to a point less than that corresponding to the speed of 15 miles per hour of the vehicle, the alternating current relay R becomes de-energized, and if this de-energization occurs while the vehicle is running at a speed higher than 15 miles per hour contact P being open the valve magnet 19 will be de-energized and an automatic application of the brakes will occur. The supply of current to the cab signal J will also be discontinued. The valve magnet 19 will become re-energized when the direct current motor D brings the centrifuge C to a speed such that the crosshead 8 closes the contact P, but the brake application valve will not release the brakes until the engineer has taken control of the train.

The statement which I have just made concerning the direct current motor bringing the centrifuge crosshead 8 back to a certain position is made on the assumption that the crosshead moves past the point where it closes the contact P before the direct current motor brings it back again. By so designing the apparatus that the crosshead will hold the contact P closed during an appreciable amount of time, the direct current motor would, of course, hold the speed of the centrifuge shaft up to a point where the contact would not be opened due to the centrifuge crosshead moving too far to the right.

When the apparatus is in normal condition it will not function to cause an automatic application of the brakes due to deceleration at the maximum rate. This is because the direct current motor Mᴰ will start to operate as soon as relay R opens, that is, as soon as the crosshead 8 reaches the 15 miles per hour position, and the rate of movement of the crosshead 8 is then so slow that motor Mᴰ will attain full control of the crosshead before the crosshead has an opportunity to move beyond the point where contact P is closed.

Returning to the operation of the apparatus in the event of failure of generator G, motor Mᴬ or the connections between the two, I will assume that one of the wires 21, 22, 23 or 24 becomes broken while the vehicle is traveling at a high speed, such as 50 miles per hour. Such breakage will result in the immediate de-energization of relay R, and inasmuch as contact P is then open, valve 20 will immediately open to cause an automatic brake application. If the shaft 5 should seize in its bearings, relay R would still become de-energized because motor M^A when at rest would constitute a shunt path of low resistance across this relay.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a vehicle, an alternating current generator operatively connected with the running gear of said vehicle, a synchronous motor supplied with current by said generator, a speed-responsive device driven by said motor, and governing means on the vehicle controlled by said speed responsive device.

2. In combination, a vehicle, a device operatively connected with the running gear thereof and constantly functioning as a generator when the vehicle is in motion, a motor supplied with current by said device, and governing means on the vehicle controlled by said motor.

3. In combination, a vehicle, a generator operatively connected with the running gear thereof, a motor supplied with current by said generator, a speed responsive device driven by said motor, and governing means on the vehicle controlled by said speed responsive device.

4. In combination, a vehicle, an alternating current generator operatively connected with the running gear thereof, a synchronous motor supplied with current by said generator, and speed controlling means on the vehicle controlled by said motor.

5. In combination, a vehicle, a generator operatively connected with the running gear thereof, a motor supplied with current by said generator, a centrifuge driven by said motor and provided with a crosshead, a fluid pressure valve controlled by said crosshead, and speed governing means for the vehicle controlled by said valve.

6. In combination, a vehicle, a generator operatively connected with the running gear thereof, a motor supplied with current by said generator, a centrifuge driven by said motor, and speed governing means for said vehicle including a crosshead operated by said centrifuge.

7. In combination, a vehicle, a generator operatively connected with the running gear thereof, a motor supplied with current by said generator, speed governing means for the vehicle controlled by said motor, a relay also supplied with current by said generator and arranged to be closed or open according as the speed of the vehicle is above or below a given low value, means for applying the vehicle brakes when said relay is open, and means operating when the vehicle speed passes through said given low value under maximum normal deceleration to prevent a brake application due to opening of said relay.

8. In combination, a vehicle, a generator operatively connected with the running gear thereof, a motor supplied with current by said generator, a centrifuge driven by said motor, speed governing means for the vehicle controlled by said centrifuge, a relay supplied with current by said generator and arranged to be closed or open according as the speed of the vehicle is above or below a given low value, protective means for applying the brakes when said relay is open, an auxiliary motor for driving said centrifuge at a speed corresponding to said given low vehicle speed, an auxiliary source of current on the vehicle for operating said auxiliary motor, and means effective when said centrifuge is operating at said given low speed to prevent said protective means from applying the brakes even though said relay is open.

9. In combination, a vehicle, a generator operatively connected with the running gear thereof, a motor supplied with current by said generator, governing means for the vehicle controlled by said motor, and means for applying the vehicle brakes if said generator or said motor fail while the speed of the vehicle is above a given low value.

10. In combination, a vehicle, a generator operatively connected with the running gear thereof, a motor supplied with current by said generator, a centrifuge driven by said motor, governing means for the vehicle controlled by said centrifuge, and means for applying the vehicle brakes if said generator or said motor fail while the speed of the vehicle is above a given low value.

11. In combination, a vehicle, a generator operatively connected with the running gear thereof, a motor supplied with current by said generator, speed governing means for the vehicle controlled by said motor, a relay supplied with current by said generator and arranged to be closed or open according as the speed of the vehicle is above or below a given low value, protective means for applying the vehicle brakes when said relay is open, and mechanism controlled by said relay and by said centrifuge for preventing said protective means from applying the brakes when said relay opens due to normal deceleration of the vehicle.

12. In combination, a vehicle, a generator operatively connected with the running gear thereof, a motor supplied with current by said generator, speed governing means for the vehicle controlled by said motor, a relay supplied with current by said generator and arranged to be closed or open according as the speed of the vehicle is above or below a given low value, protective means for applying the vehicle brakes when said relay is open, and mechanism controlled by said relay and by said centrifuge for preventing said protective means from applying the brakes when said relay opens due to normal deceleration of the vehicle and signaling means on the vehicle controlled in part by said relay.

13. In combination, a vehicle, a shaft thereon, means for driving said shaft at a definite speed for each value of the speed of the vehicle, and governing means on said vehicle controlled by said shaft.

14. In combination, a vehicle, a shaft thereon, means for driving said shaft at a definite speed for each value of the speed of the vehicle, a speed responsive device operated by said shaft, and governing means on said vehicle controlled by said speed responsive device.

In testimony whereof I affix my signature.

LEMUEL F. HOWARD.